(12) United States Patent
McLaughlin et al.

(10) Patent No.: US 11,726,440 B2
(45) Date of Patent: Aug. 15, 2023

(54) INDUSTRIAL CONTROL SYSTEM HAVING MULTI-LAYERED CONTROL LOGIC EXECUTION

(71) Applicant: Honeywell International Inc., Morris Plains, NJ (US)

(72) Inventors: Paul Francis McLaughlin, Ambler, PA (US); Nagaraja Sundaresh, Hyderabad (IN); Joseph Pradeep Felix, Phoenixville, PA (US); Jethro Francis Steinman, Haverford, PA (US); Ram Mohan Anugu, Hyderabad (IN); Jason Thomas Urso, Houston, TX (US); Joseph J Pane, North Wales, PA (US)

(73) Assignee: Honeywell International Inc., Charlotte, NC (US)

( * ) Notice: Subject to any disclaimer, the term of this patent is extended or adjusted under 35 U.S.C. 154(b) by 17 days.

(21) Appl. No.: 17/352,779

(22) Filed: Jun. 21, 2021

(65) Prior Publication Data
US 2022/0004156 A1    Jan. 6, 2022

Related U.S. Application Data

(60) Provisional application No. 63/047,049, filed on Jul. 1, 2020.

(51) Int. Cl.
*G06F 13/14* (2006.01)
*G05B 19/042* (2006.01)
(Continued)

(52) U.S. Cl.
CPC ............. *G05B 19/042* (2013.01); *G06F 9/22* (2013.01); *G06F 9/30* (2013.01); *G06F 9/3012* (2013.01);
(Continued)

(58) Field of Classification Search
None
See application file for complete search history.

(56) References Cited

U.S. PATENT DOCUMENTS

| 7,254,512 B2 * | 8/2007 | Odom ................ G16H 40/63 717/124 |
| 9,447,985 B2 | 9/2016 | Johnson, Jr. |

(Continued)

FOREIGN PATENT DOCUMENTS

| CA | 3043996 A1 | 2/2018 |

OTHER PUBLICATIONS

Johnson, Jr., "CoolingLogic(TM)—A Method to increase HVAC System Efficiency and Decrease Energy Consumption," A White Paper, Johnson Solid State, L.L.C., Sep. 24, 2016. (51 pages total).

(Continued)

*Primary Examiner* — Michael Sun
(74) *Attorney, Agent, or Firm* — John Maldjian; Stevens & Lee PC

(57) ABSTRACT

A process control system includes a process controller level including at least one process controller, and an input/output (I/O) module level including at least one I/O module. The process controller level and the I/O module level are communicatively coupled. and each include control logic comprising control hardware or algorithm blocks. The control logic in the process controller level and the I/O module level are configured to execute and exchange data to perform process control for a process run by the process control system in a distributed fashion across the process controller level and the I/O module level.

16 Claims, 2 Drawing Sheets

(51) Int. Cl.
  *G06F 15/78* (2006.01)
  *G06F 9/30* (2018.01)
  *G06F 9/22* (2006.01)
  *G06F 13/16* (2006.01)
(52) U.S. Cl.
  CPC ............ *G06F 13/14* (2013.01); *G06F 13/161* (2013.01); *G06F 15/7867* (2013.01); *G05B 2219/21007* (2013.01)

(56) References Cited

U.S. PATENT DOCUMENTS

| | | | |
|---|---|---|---|
| 10,216,246 | B2 | 2/2019 | Rajwan et al. |
| 10,248,601 | B2* | 4/2019 | McLaughlin ....... G06F 13/4027 |
| 10,871,756 | B2 | 12/2020 | Johnson, Jr. et al. |
| 10,908,578 | B2 | 2/2021 | Johnson, Jr. et al. |
| 10,921,768 | B2 | 2/2021 | Johnson, Jr. et al. |
| 11,156,978 | B2 | 10/2021 | Johnson, Jr. et al. |
| 2007/0240069 | A1 | 10/2007 | Eldridge et al. |
| 2016/0061473 | A1 | 3/2016 | Johnson, Jr. et al. |
| 2016/0320759 | A1* | 11/2016 | Macha .................... G06F 11/16 |
| 2016/0359866 | A1 | 12/2016 | Mixer |
| 2020/0103844 | A1* | 4/2020 | Victoriano .......... G06F 16/9035 |
| 2020/0256571 | A1 | 8/2020 | Johnson, Jr |
| 2021/0356927 | A1 | 11/2021 | Johnson, Jr et al. |

OTHER PUBLICATIONS

Johnson, Jr., "CoolingLogic(TM): Mosaic Christian Church, A Case Study," Feb. 2, 2019. (140 pages total).
Building Automation Systems Shelby Michigan 48316 SG, Johnson Heating and Cooling L.L.C., Retrieved from: www. cooljohnson.com/Building-Automation-Systems-Michigan/Shelby-Township-Michigan/Building-Automation-Systems-SG.html, Retrieved on: Nov. 21, 2022 (3 pages total).
Building Automation System St. Clair County, Michigan, Johnson Heating and Cooling L.L.C., Retrieved from: www.cooljohnson.com/ Building-Automation-Systems-Michigan/St-Clair-Michigan/ Building-Automation-system-St-Clair-Michigan.html, Retrieved on Nov. 21, 2022 (4 pages total).
Building Automation System Troy Michigan Oakland Mall, Johnson Heating and Cooling L.L.C., Retrieved from: www.cooljohnson.comi Building-Automation-Systems-Michigan/Troy Michigan/ Building-Automation-System-Oakland-Mall.html, Retrieved on Nov. 21, 2022 (4 pages total).
Building Automation System Romeo Michigan 48065 RomeoPR, Johnson Heating and Cooling, L.L.C., Retrieved from: www. cooljohnson.com/Building-Automation-Systems-Michigan/Romeo-Michigan/Building-Automation-System-RomeoPR. html, Retrieved on: Nov. 21, 2022 (2 pages total).
Building Automation System Plymouth, Michigan, Johnson Heating and Cooling L.L.C., Retrieved from: www.cooljohnson.com/ Building-Automation-Systems-Michigan/Plymouth-Michigan/Building-Automation-System-Plymouth-Michigan.html, Retrieved on: Nov. 21, 2022 (8 pages total).

Building Automation in Michigan—Divine Grace, Johnson Heating and Cooling L.L.C., Retreived from: www.cooljohnson.com/Building-Automation-Systems-Michigan/Oakland-County-Michigan/Building-Automation-Divine-Grace.html, Retrieved on: Nov. 21, 2022 (3 pages total).
Building Automation in Detroit—Mosaic Christian, Johnson Heating and Cooling L.L.C., Retrieved from: www.cooljohnson.com/ Building-Automation-Systems-Michigan/Detroit/Mosaic-Christian. html, Retreived on Nov. 21, 2022(5 pages total).
Building Automation Clawson Michigan 2.0, Johnson Heating and Cooling L.L.C., Retrieved from: www.cooljohnson.com/Building-Automation-Systems-Michigan/Clawson-Michigan/Building-Automation-Clawson-Manor-2.html, Retrieved on Nov. 21, 2022 (6 pages total).
Building Automation Systems Waterford Michigan 48329 WIM, Johnson Heating and Cooling L.L.C., Retrieved from: www. cooljohnson.com/Building-Automation-Systems-Michigan/Building-Automation-Systems-WIM.html, Retreived on Nov. 21, 2022 (3 pages total).
Building Automation Systems Waterford Michigan 48330 SJMO, Johnson Heating and Cooling, L.L.C., Retrieved from: www. cooljohnson.com/Building-Automation-Systems-Michigan/Waterford-Michigan/Building-Automation-Systems-SJMO.html, Retreived on Nov. 21, 2022 (2 pages total).
Building Automation System Waterford Michingan 48328 JLA, Johnson Heating and Cooling L.L.C., Retrieved from: www. cooljohnson.cm/Building-Automation-Systems-Michigan/Waterford-Michigan/Building-Automation-System—JLA.html. Retrieved on: Nov. 21, 2022 (3 pages total).
Building Automation System Waterford Michigan 48327 Excel, Johnson Heating and Cooling L.L.C., Retreived from: www. cooljohnson. mm/Building-Automation-Systems-Michigan/Waterford-Michigan/Building-Automation-System-excel.html, Retreived on: Nov. 22, 2022 (2 pages total).
Johnson, Jr., "Cooling Logic": Changing the Way You Cool, Johnson Solid State, LLC, Nov. 7, 2018 (12 pages total).
Building Automation System Clawson Michigan Clawson Manor, Johnson Heating and Cooling L.L.C., Retrieved from: www. cooljohnson.com/building-Automation-Systems-michigan/clawson-Michigan/building-Automation-System-Clawson-Manor.html, Retrieved on: Nov. 21, 2022. (3 pages total).
Building Automation System in Michigan, Johnson Heating and Cooling, L.L.C., Retrieved from: www.cooljohnson.com/Building-Automation-Systems-Michigan/Macomb-County-Michigan/Building-Automation-Confidential-Customer.html, Retrieved on: Nov. 21, 2022.(4 pages total).
"So what is CoolingLogic™?" Johnson Solid State, LLC, Retrieved from: http://coolinglogic.com/CoolingLogic-How-it-Works.html, Retreived on: Dec. 15, 2022 (3 pages total).
Extended European Search Report dated Nov. 12, 2021, issued in connection with corresponding European patent application No. 21182174 (9 pages total).
Indian Examination Report dated Mar. 7, 2022, issued in connection with corresponding Indian patent application No. 202114028710 (6 pages total).

* cited by examiner

INDUSTRIAL CONTROL SYSTEM HAVING MULTI-LAYERED CONTROL LOGIC EXECUTION

CROSS REFERENCE TO RELATED APPLICATIONS

This application claims the benefit of Provisional Application Ser. No. 63/047,049 entitled "INDUSTRIAL CONTROL SYSTEM HAVING MULTI-LAYERED CONTROL LOGIC EXECUTION", filed on Jul. 1, 2020, which is herein incorporated by reference in its entirety.

FIELD

This Disclosure relates to process controller arrangements for industrial control systems.

BACKGROUND

An industrial control system typically comprises a hierarchy of control system hardware components including process controllers, such as programmable logic controllers. Process controllers are coupled to input/output (I/O) modules that are used to interface with field devices that are coupled to the processing equipment, where the field devices include sensors for sensing physical parameters and actuators for acting on control signals received from the controller to change a setting on processing equipment. In some known process controller applications, the process controller needs to operate at high speed, such as having a maximum latency (delay) of a few thousandths of a second (msec) measured from the time of receiving the sensor data to the time of generating the control signal responsive to the sensor information. Although latency can be reduced by moving the process control from the process controllers to the I/O modules, this arrangement is generally not used because of a resulting small scope of I/O connectivity and the resulting small scope of process control.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize the problem for process control systems (PCSs) including industrial control systems, of latency for conventional process controllers which can result in the process controller(s) having a sluggish response responsive to a change in an input value sensed by a sensor. An application example needing short latency can be from discrete control applications including factory automation, conveyer belts, fast mechanical control, and turbine control. In one specific example application, a proximity switch (as the position sensor) input on a conveyor belt senses when a bottle is in position to be filled with a liquid, and the process controller responsive to the switch provided input commands a valve to open, fills the bottle, stops the fill, and moves the bottle to the next position for the bottle to be capped.

As another example, a position sensor is used to cut material into strips and the process controller responsive to the sensed parameter received from the position sensor commands an output to engage a cutting element. The position sensor generally includes a proximity sensor configured to ensure a worker's hand did not try to position the material while the cutter is engaged (a safety interlock), which needs a short latency for fulfilling its intended safety function.

One known PCS utilizes comparatively high-speed logic circuitry implemented solely in the process controllers to achieve the latency level needed for certain applications. However, the architecture of a conventional centralized process controller executing logic can degrade the latency performance when the number of I/O points and logic size is increased. In such an architecture all control strategies tend to draw equally on the computing (processing) and communication resources, even though generally only a subset of the strategies require a short latency.

Disclosed control arrangements for a PCS place the control logic for controlling the process into two or more different levels that results in a disclosed control system configuration supporting a moderately large number of I/O points (such as up to 10,000 I/O points), while still having a short latency that is typically 1 ms to 5 ms. Disclosed control arrangements implement a tradeoff between 1) the scope of control, meaning how many I/O points does a single, integrated control strategy need to connect to, and 2) the latency that can be achieved between the process controller and the IO modules. Optionally, the I/O modules can comprise what is termed universal I/O modules that supports four different output types comprising an analog input (AI), analog output (AO), digital input (DI), and a digital output (DO).

Disclosed aspects include a PCS comprising a process controller level including a process controller, and an I/O module level including at least one I/O module communicatively coupled to the process controller. The process controller level and the I/O module level both include their own control logic comprising control hardware and/or algorithm (software) blocks. There can also be a mixture of hardware and algorithm blocks. The control logic in the process controller level and in the I/O module level are each configured to execute and exchange data to perform process control for process that is run by the PCS in a distributed fashion being distributed between the process controller level and the I/O module level.

DETAILED DESCRIPTION

Figure 1:
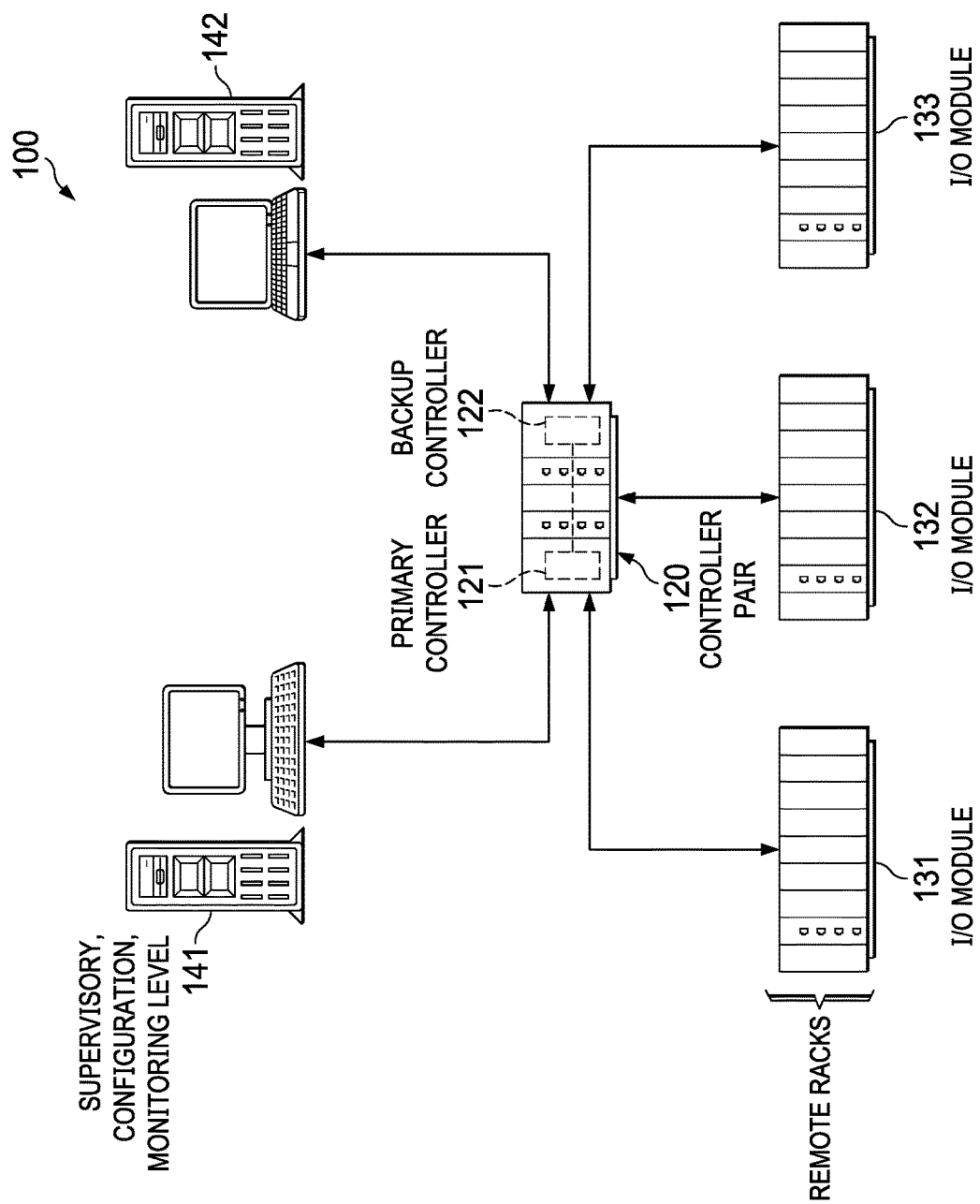
FIG. 1 shows a portion of a conventional PCS including a redundant process controller pair shown as an example controller configuration, according to a disclosed aspect.

Disclosed aspects are described with reference to the attached figures wherein like reference numerals are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the aspects disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 shows a portion of a conventional PCS 100 including a redundant controller pair 120 comprising a primary controller 121 and a secondary controller 122, where the redundant controller pair 120 is shown connected to multiple I/O modules, shown as I/O module 131, 132 and 133, with each I/O module each generally supporting a plurality of communication channels (also known as I/O points). The redundant controller pair 120 may be interfaced to the I/O modules 131, 132, and 133 through an I/O scanner.

The redundant controller pair 120 is also shown coupled to supervisory computers, shown as supervisor computer 141 and supervisor computer 142. In traditional control systems, the controller performs all the algorithm processing required for running the control loops, and the I/O modules perform the receiving of the sensing information from the sensors and the driving of actuators. The I/O level is shown comprising I/O modules 131, 132, 133.

A disclosed control logic scheme makes the control functionality available at plurality of levels of the PCS besides conventionally only at the controller level which is the sole level implemented for conventional control systems, such as the conventional process control system 100 shown in FIG. 1. Disclosed control logic schemes also include control logic positioned in the I/O modules, and if I/O scanners are also provided in the PCS, control logic can be positioned in the I/O scanners as well. As noted above, the I/O modules can comprise what is termed universal I/O modules which support as shown AI, AO, DI, DO on the same I/O modules. Disclosed control logic can be implemented in software (such as firmware) or in hardware (for example using programmable gate arrays (PGAs).

The disclosed scheme of running the control logic at multiple levels enables low screw-to-screw latency for fast control loops by running the control logic closer to the I/O screws. The term "screw" as used herein is a shorthand term for the I/O cable which refers to connections to gray level analog signals such as Highway Addressable Remote Transducer (HART) protocol signals or single bit discrete signals, provide a connection on a terminal block that connects from the I/O modules to the field devices (sensor or actuator). Running control logic on the I/O modules also prevents delays in data flowing to the controller and when the controller sends control signals reaching back to the I/O modules.

Figure 2:
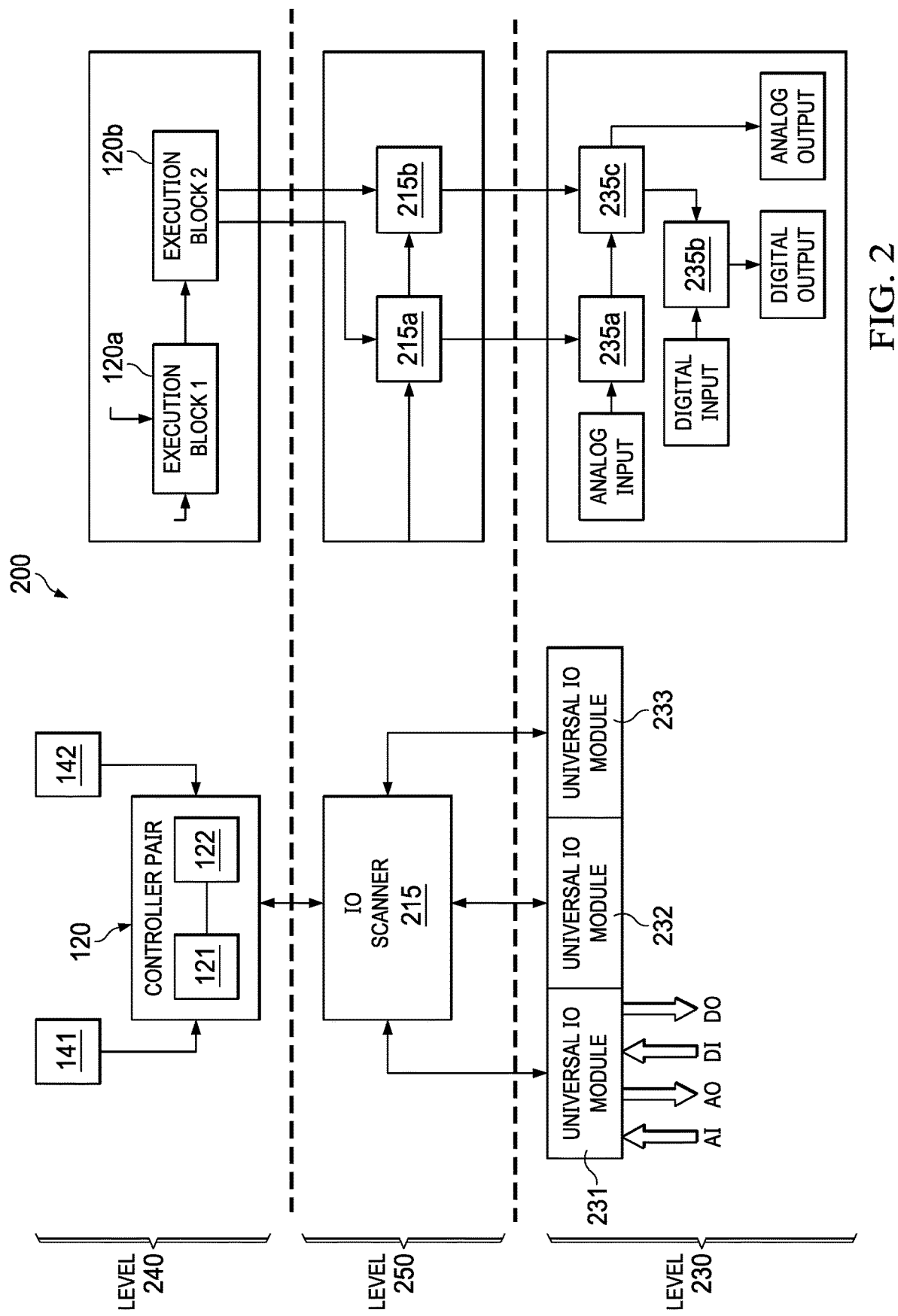
FIG. 2 illustrates a portion of a disclosed PCS including control logic running at a plurality of different levels which may be compared to the conventional process control system shown in FIG. 1 which runs its control logic only at the controller level.

FIG. 2 illustrates a portion of a PCS 200 including control logic running at a plurality of different levels which may be compared to the PCS 100 shown in FIG. 1 which runs control logic only at the controller level. Although the control logic in the PCS 200 is shown implemented by software by including algorithm blocks, as noted above the control logic may also be implemented using hardware, or a mixture of both hardware and software.

Each algorithm block to the right of FIG. 2 shown can be implemented as a function block, ladder logic, a textual program block, or can be implemented using languages specified in standards such as IEC61131-3 or any suitable programming language that can be implemented in hardware or in software. IEC 61131-3 is known to be the third part (of 10) of the open international standard IEC 61131 for programmable logic controllers, which was first published in December 1993. The PCS 200 shown in FIG. 2 includes an I/O module level 230 including I/O modules shown optionally as being universal I/O modules 231, 232, and 233, an optional scanner level 250 with an I/O scanner 215, and a process controller level 240 including a process controller optionally shown as a redundant process controller 120 that includes a primary controller 121 and a backup controller 122. As with PCS 100, the redundant controller pair 120 is shown coupled to supervisory computers, shown as supervisor computer 141 and supervisor computer 142.

Algorithm blocks are shown at multiple levels in the PCS 200, shown as 120a, 120b for the controller level 240, 215a and 215b for the I/O scanner level 250, and 235a, 235b, and 235c for the I/O module level 230. These algorithm blocks are shown communicatively coupled together, such as by an ethernet connection, and are configured to all execute simultaneously at the three different levels 230, 240, and 250 as shown, and also exchange data across each of the levels to perform process control of a process in a distributed fashion. In one aspect, the simultaneous control processing occurring at the process controller level 240, the I/O scanner level 250 and I/O module level 230 can be synchronized. In another aspect, the process control occurring at these respective levels may not be synchronized.

The universal I/O modules 231, 232 and 233 can support a pulse input and a frequency input in addition to at least one other input type. Although not shown, the I/O scanner 215 can also be a redundant arrangement as can each of the universal IO modules 231, 232 and 233. Conversely, although the controller module is shown as a redundant controller arrangement shown as control pair 120 comprising controller 121 and controller 122. However, the controller module can be implemented with one or more non-redundant controllers. Moreover, the disclosed algorithm blocks can run on any of the three levels 230, 250 and 240 regardless of whether they are redundant or non-redundant. The term layer is sometimes substituted for the term level in reference to a PCS.

The configuration of the PCS 200 can be enabled by creating different types of containers for the different levels. The term containers as used herein allow different sets of algorithm blocks to be supported by each level in the PCS 200. Containers can also be termed Program Organization Units (POUs). The containers or control programs can run a variety of different algorithm block types depending on what is deemed needed. Depending on the level at which the control is performed, the set of potential algorithm blocks can be broad and inclusive, or it can be more specialized.

However, in general, any algorithm block might run at any level of the process control system. Each of the containers can be converted into a loadable module configured to be downloaded to the respective level of the control system implementing the control logic. Regarding the control logic, the control logic executes at each level independently (as noted above either synchronously or asynchronously) and data is exchanged between the levels for connection data.

Control logic at the lowest level of the PCS 200 is shown comprising universal I/O modules 231, 232, 233, which can be achieved by executing downloaded modules. The usage of compiled algorithm blocks enables downloading newer algorithm block types without modifying software or firmware on level 230 having the I/O modules, without modifying software or firmware on level 230. With respect to firmware, the nature of the configuration or program loaded to the various levels of control processing hosts can be any of several possibilities. The algorithm block program code can be in the device's read-only memory (ROM), or other memory, with data configurations getting loaded, the algorithm block code can be loaded directly as executable code, or the control algorithms which run in the control processes can be implemented as a combination of loaded code and loaded data.

While various disclosed aspects have been described above, it should be understood that they have been presented by way of example only, and not as a limitation. Numerous changes to the disclosed aspects can be made in accordance with the Disclosure herein without departing from the spirit or scope of this Disclosure. Thus, the breadth and scope of this Disclosure should not be limited by any of the above-described aspects. Rather, the scope of this Disclosure should be defined in accordance with the following claims and their equivalents.

The invention claimed is:

1. A process control system, comprising:
a process controller level including at least one process controller and
an input/output (I/O) module level including at least one I/O module coupled to the process controller;
wherein the process controller level and the I/O module level are communicatively coupled and both include control logic comprising control hardware or algorithm blocks; and
wherein the control logic in the process controller level and in the I/O module level are configured to execute and exchange data to perform process control for a process run by the process control system in a distributed fashion across the process controller level and the I/O module level, wherein the process controller level, a scanner level, and the (I/O) module level, are configured to execute operations simultaneously and exchange data.

2. The process control system of claim 1, wherein the at least one I/O module comprises a plurality of the I/O modules each comprising a universal I/O module that supports analog inputs, analog outputs, digital inputs, and digital outputs.

3. The process control system of claim 2, wherein the universal I/O modules support a pulse input and a frequency input.

4. The process control system of claim 1, wherein the control logic in the process controller level and in the I/O module level both comprise the control hardware.

5. The process control system of claim 1, further comprising the scanner level between the process controller level and the I/O module level including at least one I/O scanner, wherein the I/O scanner includes control logic comprising the control hardware or the algorithm blocks.

6. The process control system of claim 1, wherein the control logic in the process controller level and in the I/O module level both comprise the algorithm blocks.

7. The process control system of claim 1, wherein the control logic in the process controller level and in the I/O module level both comprise the algorithm blocks and the control hardware.

8. The process control system of claim 1, wherein the at least one process controller comprises a redundant controller arrangement comprising independent first and second process controllers.

9. A method of operating a process control system including a process controller level including at least one process controller, and an I/O module level including at least one an I/O module coupled to the process controller comprising:
providing the process controller level and the I/O module level communicatively connected and both including control logic including control hardware or algorithm blocks; and
using the control logic to execute and exchange data to perform process control for a process run by the process control system in a distributed fashion across the process controller level and the I/O module level, wherein the process controller level, a scanner level, and the (I/O) module level, are configured to execute operations simultaneously and exchange data.

10. The method of claim 9, wherein the at least one I/O module comprises a plurality of the I/O modules comprising at least one universal discrete I/O module that supports the digital input, and the digital output, but not the analog input or the analog output.

11. The method of claim 10, wherein the universal I/O modules supports a pulse input and a frequency input.

12. The method of claim 9, wherein the control logic in the process controller level and in the I/O module level both comprise the control hardware.

13. The method of claim 9, wherein the control logic comprises the algorithm blocks.

14. The method of claim 9, wherein the process control system further comprises the scanner level between the process controller level and the I/O module level including at least one I/O scanner, wherein the I/O scanner includes control logic comprising the control hardware or the algorithm blocks.

15. The method of claim 9, wherein the control logic both comprise the algorithm blocks.

16. The method of claim 9, wherein the at least one process controller comprises a redundant controller arrangement comprising independent first and second process controllers.

* * * * *